US009009345B1

(12) United States Patent
Carbone et al.

(10) Patent No.: US 9,009,345 B1
(45) Date of Patent: Apr. 14, 2015

(54) ASYNCHRONOUS DATA PROTOCOL

(75) Inventors: Kenneth Carbone, Annandale, VA (US); Robert D. Greenlee, Leesburg, VA (US); Marc A. Katchay, Silver Spring, MD (US); Harry G. Morgan, Leesburg, VA (US); Scott A. Quillen, Middleburg, VA (US)

(73) Assignee: AOL Inc., Dulles, VA (US)

( * ) Notice: Subject to any disclaimer, the term of this patent is extended or adjusted under 35 U.S.C. 154(b) by 991 days.

(21) Appl. No.: 09/582,297

(22) PCT Filed: Dec. 22, 1998

(86) PCT No.: PCT/US98/27268
§ 371 (c)(1),
(2), (4) Date: Apr. 8, 2002

(87) PCT Pub. No.: WO99/34555
PCT Pub. Date: Jul. 8, 1999

Related U.S. Application Data

(60) Provisional application No. 60/068,868, filed on Dec. 24, 1997, provisional application No. 60/070,617, filed on Jan. 6, 1998.

(51) Int. Cl.
*G06F 15/16* (2006.01)
*G06F 9/445* (2006.01)

(52) U.S. Cl.
CPC ........................................ *G06F 8/61* (2013.01)

(58) Field of Classification Search
USPC ......... 709/236, 203, 217, 223, 224, 230, 282; 370/392, 399, 401, 405
See application file for complete search history.

(56) References Cited

U.S. PATENT DOCUMENTS

| 5,481,710 | A | | 1/1996 | Keane et al. | |
|---|---|---|---|---|---|
| 5,717,860 | A | | 2/1998 | Graber et al. | |
| 5,857,203 | A | * | 1/1999 | Kauffman et al. | 707/200 |
| 5,946,687 | A | | 8/1999 | Gehani et al. | |
| 5,974,547 | A | * | 10/1999 | Klimenko | 709/217 |
| 5,999,882 | A | | 12/1999 | Simpson et al. | |
| 6,038,601 | A | * | 3/2000 | Lambert et al. | 709/226 |
| 6,085,251 | A | * | 7/2000 | Fabozzi, II | 709/237 |

(Continued)

FOREIGN PATENT DOCUMENTS

| EP | 0643541 A2 | 3/1995 |
|---|---|---|
| EP | 0645688 A1 | 3/1995 |

(Continued)

OTHER PUBLICATIONS

Stevens, W. Richard, "TCP/IP Illustrated, vol. 1: The Protocols", Addison-Wesley, 1994 (ISBN-0-201-63346-9).*

(Continued)

*Primary Examiner* — Ramy M Osman
(74) *Attorney, Agent, or Firm* — Finnegan, Henderson, Farabow, Garrett & Dunner, LLP

(57) ABSTRACT

A method of asynchronously transferring a plurality of files between client and host devices is provided. The method includes transmitting to a client device a plurality of identifiers for files and transferring between the host and client devices a data frame that includes an identifier and at least a portion of the corresponding file. Each identifier corresponds to a different one of the files to be transferred. The method also includes repeating the data frame transfers until the plurality of files has been transferred.

25 Claims, 10 Drawing Sheets

(56) References Cited

U.S. PATENT DOCUMENTS

| | | | |
|---|---|---|---|
| 6,122,639 A | 9/2000 | Babu et al. | |
| 6,151,631 A | 11/2000 | Ansell et al. | |
| 6,208,995 B1 | 3/2001 | Himmel et al. | |
| 6,215,769 B1* | 4/2001 | Ghani et al. | 370/230 |
| 6,310,630 B1 | 10/2001 | Kulkarni et al. | |
| 6,324,492 B1* | 11/2001 | Rowe | 709/203 |
| 6,438,592 B1* | 8/2002 | Killian | 709/224 |
| 6,442,587 B1* | 8/2002 | Yoshida | 709/203 |
| 6,544,295 B1 | 4/2003 | Bodnar | |
| 6,546,488 B2 | 4/2003 | Dillon | |
| 6,594,701 B1* | 7/2003 | Forin | 709/232 |
| 6,754,228 B1* | 6/2004 | Ludwig | 370/468 |
| 6,769,009 B1 | 7/2004 | Reisman | |
| 6,963,923 B1* | 11/2005 | Bennett | 709/232 |
| 2002/0026349 A1 | 2/2002 | Reilly et al. | |
| 2003/0081582 A1* | 5/2003 | Jain et al. | 370/338 |
| 2008/0147876 A1* | 6/2008 | Campbell et al. | 709/232 |
| 2009/0132543 A1* | 5/2009 | Chatley et al. | 707/10 |

FOREIGN PATENT DOCUMENTS

| | | |
|---|---|---|
| EP | 0749081 A1 | 12/1996 |
| EP | 0 862 304 A2 | 2/1998 |
| WO | WO 96/42145 | 12/1996 |
| WO | WO97/25804 | 7/1997 |

OTHER PUBLICATIONS

IPSwitch, "WS_FTP User's Guide, Software Version 6", Oct. 1998, Fifth Edition, http://www.ipswitch.com.*

IPSwitch, WS_FTP Users Guide, Software Version 4.12, Nov. 1996, ftp://ftp.ecsis.net/pub/netuser/win95/ftp/ws_ftp.pdf.*

International Search Report, Jun. 25, 1999; EPO.

M. Bieber et al., "Fourth generation hypermedia: some missing links for the World Wide Web", International Journal of Human-Computer Studies, Jul. 1997, Academic Press, UK, vol. 47, No. 1, pp. 31-65, XP002101194.

L. Tauscher et al., "How people revisit web pages: empirical findings and implications for the design of history systems", International Journal of Human-Computer Studies, Jul. 1997, Academic Press, UK, vol. 47, No. 1, pp. 97-137, XP002101195.

M. Bieber, "Providing information systems with full hypermedia functionality", Proceeding of the Twenty-Sixth Hawaii International Conference on System Sciences (CAT. No. 93TH0501-7), Wailea, HI, USA, Jan. 5-8, 1993, pp. 390-400, vol. 3, XP002101196.

"Routing of Incoming Calls in an X.25 System," IBM Technical Disclosure Bulletin, vol. 32, No. 11, Apr. 1990, pp. 370-372.

Harter, A., and Hopper, A., "A Distributed Location System for the Active Office," *IEEE Network*, IEEE Service Center, vol. 9, No. 1, Jan. 1994, pp. 62-70.

Schilit, B., et al., "Context-Aware Computing Applications," *Proceedings of the Workshop on Mobile Computing Systems and Applications*, IEEE, Dec. 1994, pp. 85-90.

Schilit, B., and Theimer, M., "Disseminating Active Map Information to Mobile Hosts," *IEEE Network*, IEEE Service Center, vol. 8, No. 5, Sep. 1994, pp. 22-32.

EPO Examination Report for corresponding EP Application No. 04 077 725.2-1225, dated Jan. 18, 2008, 5 pages.

Non-Final Office Action for U.S. Appl. No. 11/838,772 dated Jan. 21, 2010, 14 pages.

* cited by examiner

ASYNCHRONOUS DATA PROTOCOL

CROSS REFERENCE TO RELATED APPLICATION(S)

This application claims the benefit of priority to U.S. Provisional Application Nos. 60/068,868, filed Dec. 24, 1997, and 60/070,617, filed Jan. 6, 1998, each of which is incorporated herein by reference.

TECHNICAL FIELD

This invention relates to transferring data between a client and a host device using a network.

BACKGROUND

FIG. 1 illustrates a system 10 for transferring data, e.g., electronic mail messages, over a network 12. The system 10 provides for uploads and downloads of data frames between client devices 14, 16 and a host device 18. The client devices 14, 16 can be personal computers with network interfaces, e.g., modems 15, 17, and the network 12 can include a telephone line. The host device 18 includes a computer 20 and a storage device 22, e.g., one or more hard disks. The host computer 20 writes data uploaded from the client devices 14, 16 to locations in the storage device 22 and reads data for downloads to the client devices 14, 16 from locations in the storage device 22. The host and client devices 18, 14, 16 transfer data using various known protocols.

As used in this document, "uploads" and "downloads" refer to data transfers from the viewpoint of the host device 18. An upload transfers one or more data frames from a client device 14, 16 to the host device 18. A download transfers one or more data frames from the host device 18 to a client device 14, 16.

As used in this document, a frame, e.g., a data frame, is a separately transferred message on the network 12.

FIGS. 2A and 2B show the formats 30, 40 of data frames that can be used by the system 10 of FIG. 1. Each data frame 30, 40 has segment for a token 32, 42 to indicate whether the frame is an upload or a download. Each data frame 30, 40 has a segment 34, 44 to identify the type of the client device 14, 16. The client devices 14, 16 can be either of two types. The first type sends data frames with about 119 bytes of data, and the second type sends data frames with about 1,000 bytes of data. Each data frame 30, 40 also has a segment 36, 46 for the data being transferred. The transferred data 36, 46 can be encoded to remove character string runs to minimize the length of the data.

An upload or download of a file generally involves sending a sequence of data frames 30, 40 in which each member of the sequence contains a sequential portion of the data file being transferred. A transfer session starts with the transfer of the data frame 30, 40 for the first data portion of the file and ends with the transfer of the data frame 30, 40 for the last data portion of the file. The system 10 of FIG. 1 transfers one data file at a time between any particular client device 14, 16 and the host device 18.

FIG. 3 illustrates how the host computer 20 stores uploaded data in the storage device 22. The host computer 20 converts the "TOKEN_UP" token in each uploaded frame to the download token, "TOKEN_DOWN". Then, the host computer 20 appends the converted frame 40 to a file 51 of the storage device 22 assigned to the particular data transfer session. Each successive data frame of the session gets appended to the same file 51, i.e. data frames on lines 50, 52, 54 of the storage device 22. The host computer 20 uses a new file 55 to store the data frames 56, 57 for the next upload session, e.g, from a new client device 14, 16.

To perform a download, for example, to a different client device 14, 16 for which the uploaded data was intended, the host computer 20 sequentially reads the lines 50, 52, 54 for each converted data frame of the file being downloaded. The computer 20 sends, in the order read, each frame to the client device 14, 16 requesting the download.

The host computer 20 uploads or downloads all data frames for a file during a single data transfer session. The host computer 20 will not start another upload or download for a client device 14, 16 until completing the present data transfer session for that client device 14, 16. Data transfers are constrained to relatively slow speeds, e.g., 28.8 kilobits per second or less, and to relatively small packet sizes so that the transfer does not overflow input buffers of the receiving device.

SUMMARY

Different implementations of the invention may include various combinations of the following features.

In a first aspect, a method of asynchronously transferring a plurality of data objects between client and host devices includes transmitting to a client device a plurality of identifiers for the data objects and transferring between the host and client devices a data frame that includes an identifier and at least a portion of the corresponding data object. Each identifier corresponds to a different one of the data objects to be transferred. The method also includes repeating the data frame transfers until the plurality of data objects has been transferred.

In a second aspect, a method of asynchronously transferring data between host and client devices includes receiving from a client device a frame to request a data transfer session; sending to the client device a frame defining a session protocol that assigns an identifier to each data object; and transferring a plurality of data frames between the client and host devices. Each data frame includes a data packet containing a portion of a data object and an identifier assigned to the data object.

In a third aspect, a method of asynchronously transferring a plurality of data objects between client and host devices includes transmitting to a client device a plurality of identifiers and routings of one or more handling processes, transferring between the client and host devices first and second data frames, and repeating the data frame transfers until the plurality of files have been transferred. Each identifier corresponds to one of the files. The first data frame includes a first identifier, a routing of a first handling process, and at least a portion of the file corresponding to the first identifier. The second data frame includes a second identifier, a routing of a second handling process, and at least a portion of the file corresponding to the second identifier.

In a fourth aspect, a method for transmitting data over a network between host and client devices includes receiving from a client device a frame requesting either a data upload session or a data download session, establishing a session protocol in response to receiving the frame, and transmitting to the client device a frame defining the session protocol. The method also includes receiving from the client device a data frame conforming to the protocol if the frame from the client device requested an upload, and transmitting to the client device a data frame conforming to the protocol if the frame from the client device requested a download.

In a fifth aspect, media are encoded with programs, executable by a machine, for performing one or more of the above-described methods.

The methods, techniques, and systems described here may provide one or more of the following advantages.

One advantage is that a client device may transfer data frames for different objects and/or for different transfer sessions either sequential or in an interleaved fashion. For example, a client can interleave data frames for uploads and downloads.

Another advantage is that the host and client devices use handshaking. Thus, a receiving device can throttle data transfers by not sending a handshake signal, i.e. a request for more data frames. Handshaking provides a tool the receiving device to avoid overflows in input buffers. Similarly, either the receiving or sending device can terminate a session by sending an abort command. The abort command device can provide a method for dealing with errors.

Finally, the host device has more control over the data transfer session. For example, the host device may assign the handling of different data objects to different host processes. The host device can also fix the size of data frames and the frame count either to accommodate a lack of host resources or to more efficiently use available host resources.

Other features and advantages will be apparent from the following description, including the drawings and the claims.

DETAILED DESCRIPTION

Figure 1:
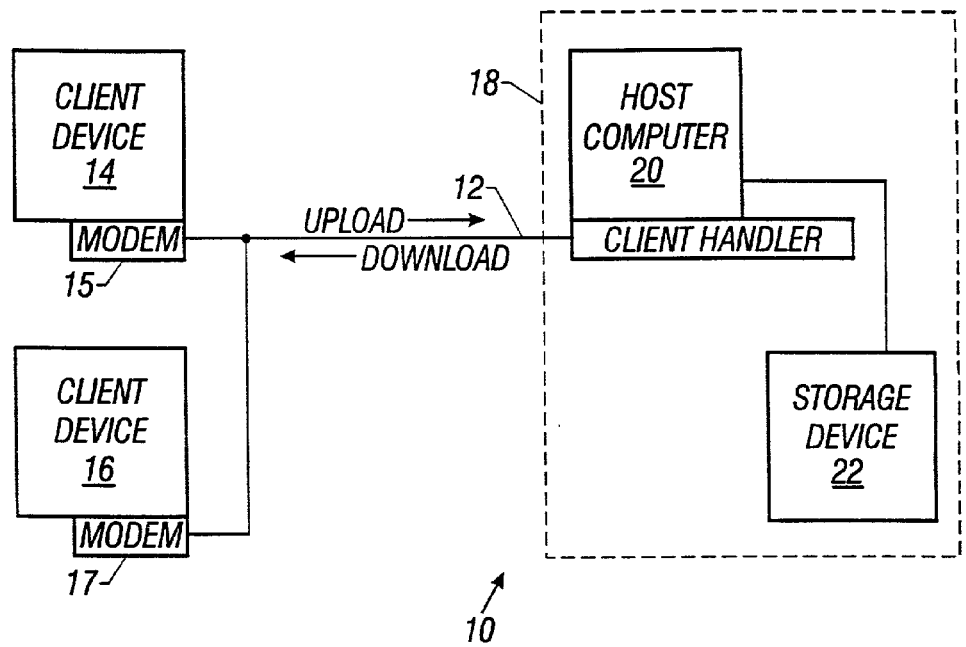
FIG. 1 shows a prior art system for transferring data between host and client devices using a network.
Figure 2A:
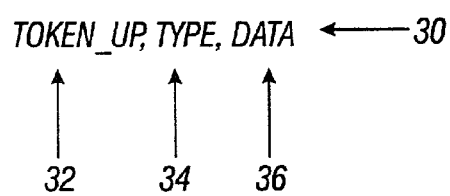
FIG. 2A shows the format of a data frame for uploading data from the client devices in the system shown in FIG. 1.
Figure 2B:
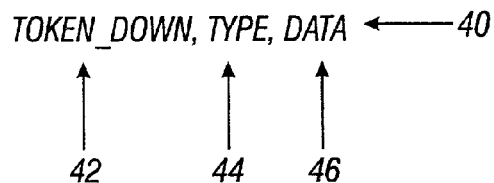
FIG. 2B shows the format of a data frame for downloading data from the host device in the system shown in FIG. 1.
Figure 3:
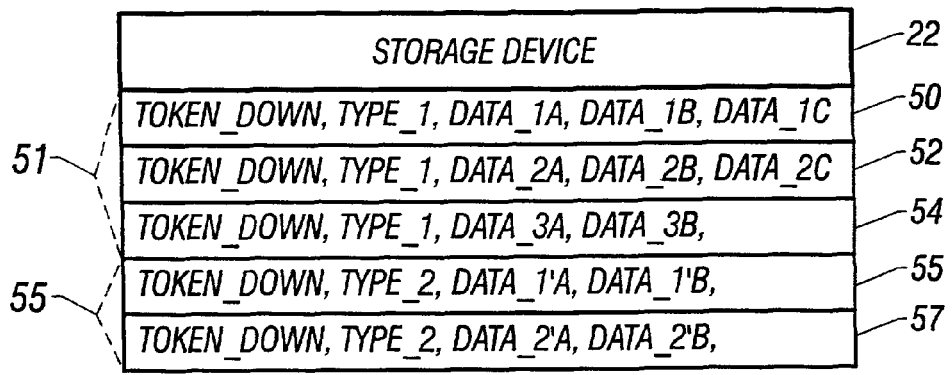
FIG. 3 illustrates how the storage device of the host device, shown in FIG. 1, stores a data file for later downloads.
Figure 4:
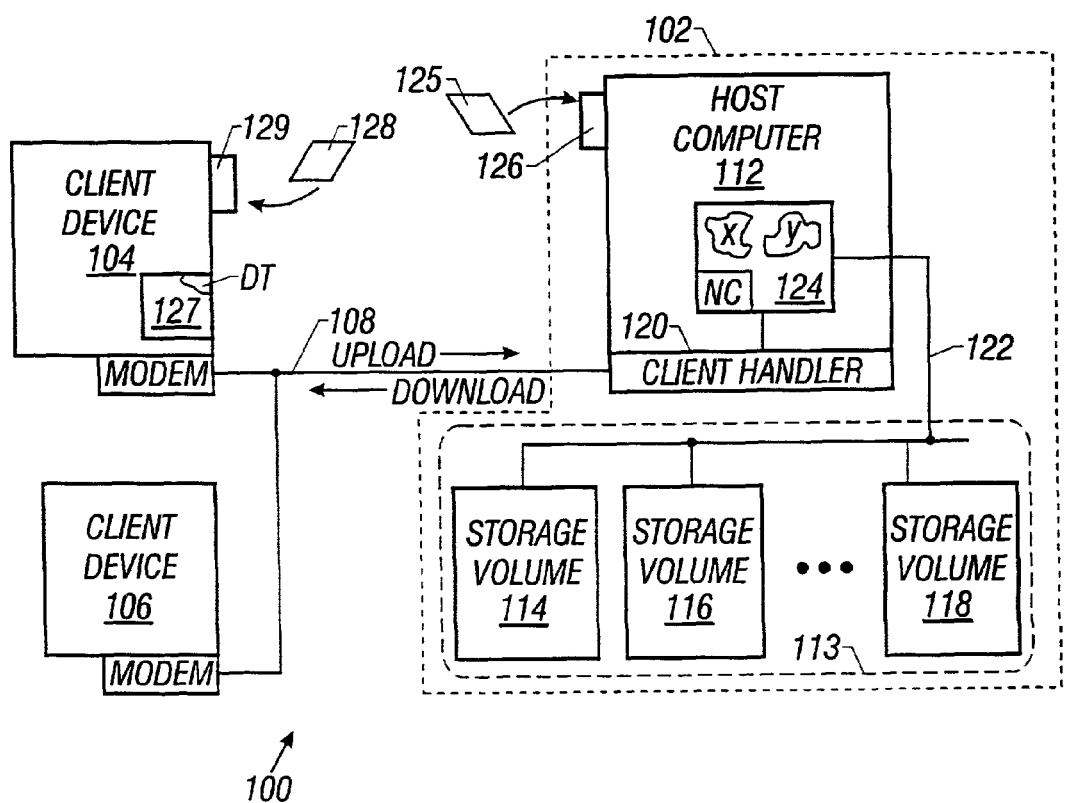
FIG. 4 shows an embodiment of a system for transferring data objects between host and client devices using a network.

FIG. 4 shows a system 100 for transferring digital data asynchronously between a host device 102 and one or more client devices 104, 106. Each data transfer is either an upload or a download, which involves a single client device 104, 106. The client devices 104, 106 may be personal computers or other hardware devices. A network 108 facilitates the transfers. The host and client devices 102, 104, 106 each have a network address and a network interface.

The network 108 may have a variety of forms. For example, the network 108 can be a local area network, a wide area network, the internet, or a similar device. The network may include an analog portion, e.g., a plain old telephone system, and/or a digital portion, e.g., an ISDN network. The devices 104, 106, 102 may use modems or other devices to convert digital data into forms transferable by the network 108. The network 108 may use a variety of protocols, e.g., the P3 protocol, and may envelop the frames used to transfer data. The network 108 can transfer digital frames and can support duplexed communications between the host and client devices 102, 104, 106.

The host device 102 includes at least one host computer 112 and a storage device 113 having a plurality of storage volumes or files 114, 116, 118. The storage device 113 may include one or more magnetic hard disks or RAM disks (both not shown). The host computer 112 can read from and write to the storage volumes 114, 116, 118 through a local network 122, e.g., a dedicated data bus. A client handler 120 interfaces the network 108 to receive frames from the client devices 104, 106 and to send frames to the client devices 104, 106. The client handler 120 may be a program, hardware, or a combination of both. The client handler 120 transfers frames between the network 108 and one or more software processes or servers X, Y, NC of the host computer 120. The processes or servers handle communications with the client devices 104, 106.

The host computer 102 has two types of processes (or programs): (1) a network communications (NC) process, and (2) handling processes X, Y. The NC process selects one or more of the handling processes X, Y, i.e. programs, in response to receiving a request from a client device 104, 106 for a data transfer session. The handling processes X, Y control and manage the transfers of data frames and the establishment of a protocol for the data transfer session.

The host computer 102 may have several copies of each process X, Y for handling data transfer sessions.

New requests from the client devices 104, 106 are forwarded to the NC process by the client handler 120. The NC process may select a handling process X, Y based on a variety of factors. The factors can include the data object to be transferred, the type of transfer to be performed, e.g., image upload/download, audio upload/download, etc., and/or on the availability of the various handling processes X, Y. For example, the NC process may select the process X to handle the data frames for the first image of the session and select the process Y to handle data frames for the second image of the transfer session. The handling processes X, Y control the session after being selected. The selected handling processes X, Y access the storage volumes 114-118 to perform uploads and downloads. The client handler 120 directs all subsequent frames for the data transfer session to the selected handling processes X, Y.

FIG. 4 shows that the host computer 112 can execute the programs X, Y, and NC from a main memory 124 or from another medium 125 readable by a drive 126 of the host computer 112. The medium 125 may be a magnetic disk or tape, an optical disk, or any other device or article of manufacture suitable for storing software programs in a form executable by the host computer 112.

Figure 5A:
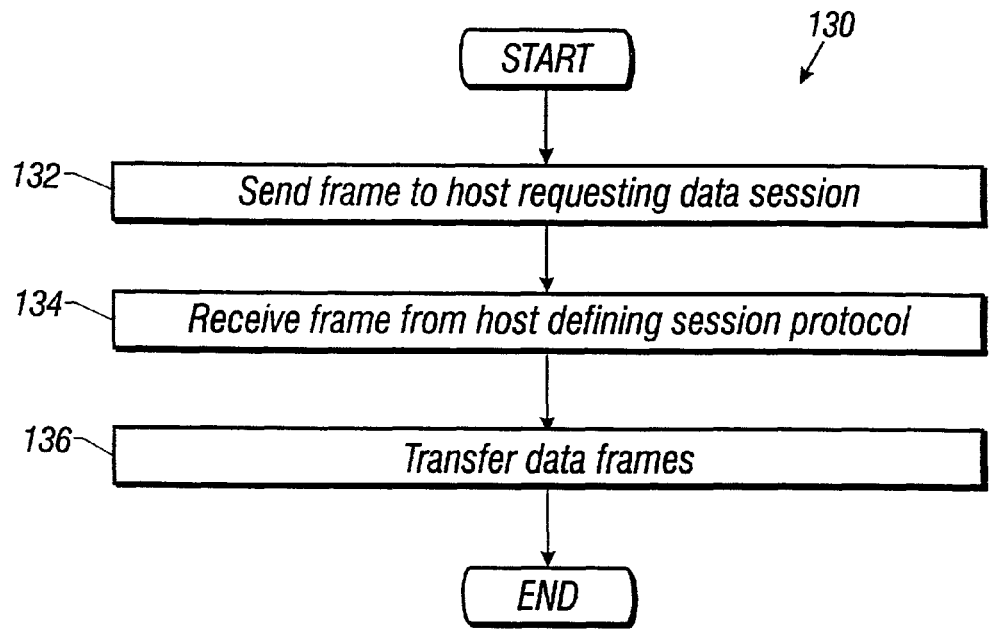
FIGS. 5A and 5B are flowcharts illustrating a method for transferring data objects over a network.
Figure 5B:
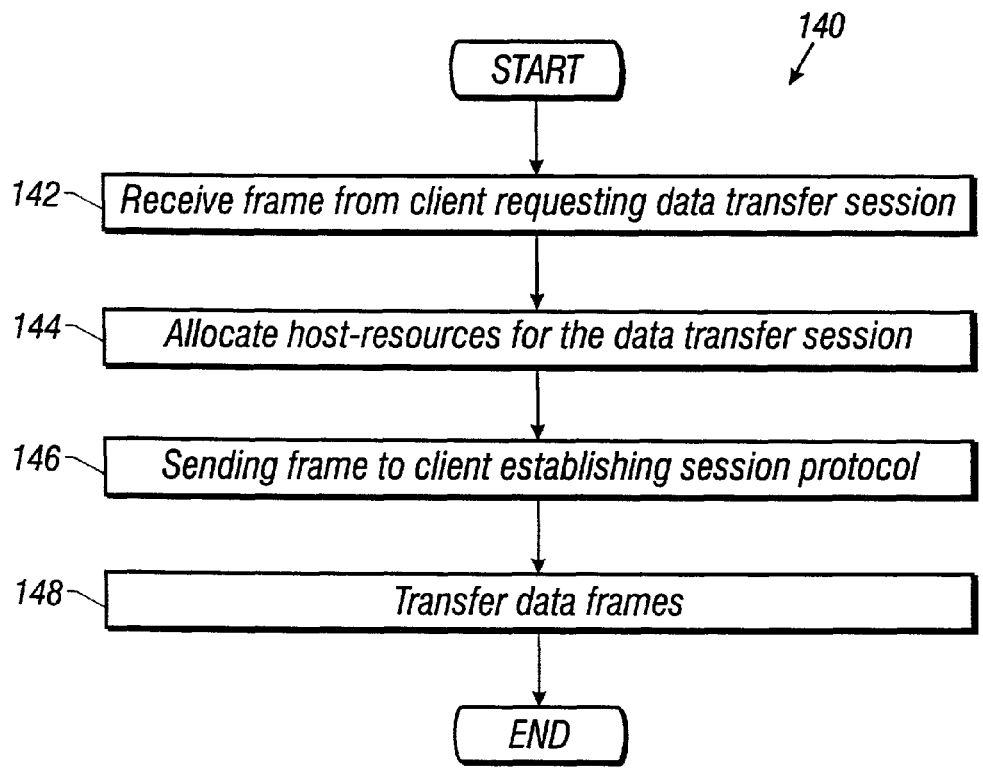

FIGS. 5A and 5B are flowcharts illustrating methods 130, 140 by which the respective client and host devices 104, 106, 102 transfer data objects over the network 108 using an asynchronous data protocol.

Referring to FIG. 5A, a client device 104, 106 initiates all data transfer sessions, i.e. both uploads and downloads. To initiate a data transfer session, the client device 104, 106 sends a frame to the host computer 112 to request the session (step 132). Then, the client device 104, 106 waits for a response from the host device 102. In response to the request, the client device 104, 106 receives a frame from the host device 102, which defines a protocol for the data transfer session (step 134). The session protocol gives a size for data frames, a frame count, a unique identifier for each data object, a routing for the process X, Y handling each data object, and commands to control the session. The routing identifies a handling process X, Y, e.g., by a memory address or by an identifying token, to the client handler 120. After receiving the frame with the session protocol, the client device 104, 106 participates in the actual transfer of a plurality of data frames, i.e. uploading or downloading the frames as the case may be (step 136). The client device 104, 106 sets up a data transfer session and then participates in the transfer of data frames, the data frames including the data packets being transferred.

The "frame count" refers to the number of successive data frames that one of the devices 102, 104, 106 can send without receiving a request frame for more data from the device 102, 104, 106 receiving the data frames. The request frame for more data implements one type of handshaking between the sender and receiver of data frames. The receiver can stop the sender from transmitting another group or "frame count" of data frames by not handshaking, i.e. by not sending the frame requesting more data. This handshaking enables the receiving device to throttle data transmission. Nevertheless, a device 102, 104, 106 still may send a number of data frames, i.e. the value of the "frame count", without receiving a handshake from the receiving device.

Referring to FIG. 4, the client device 104 has a program "DT" with instructions to execute the method of FIG. 5A. The client device 104 can execute the program "DT" from a main memory 127 or from another medium 128 readable by a drive 129 of the client device 104. The medium 128 may be a magnetic disk or tape, an optical disk, or another device or article of manufacture suitable for storing software programs in a form executable by the client device 104.

Referring to FIG. 5B, the host device 102 establishes a session protocol and then participates in the data transfers. The host device 102 receives the frame to request a data transfer session from the client device 104, 106 (step 142). In response to receiving the request, the host computer 112 allocates host resources for the data transfer session (step 144). The request from the client device 104, 106, includes information, which the host computer 112 uses to allocate host resources for the session. After allocating its resources, the host computer 112 sends a frame to the client device 104, 106 to establish a session protocol (step 146). Then, the host device 102 participates in the transfer of data frames, which include the data packets being transferred, between the client device 104, 106 and itself (step 148). Both uploads and downloads start by establishing a session protocol and then transferring data frames.

Referring to FIG. 4, the programs X, Y, and NC include instructions for performing the method 140 illustrated in FIG. 5B.

Figure 6A:
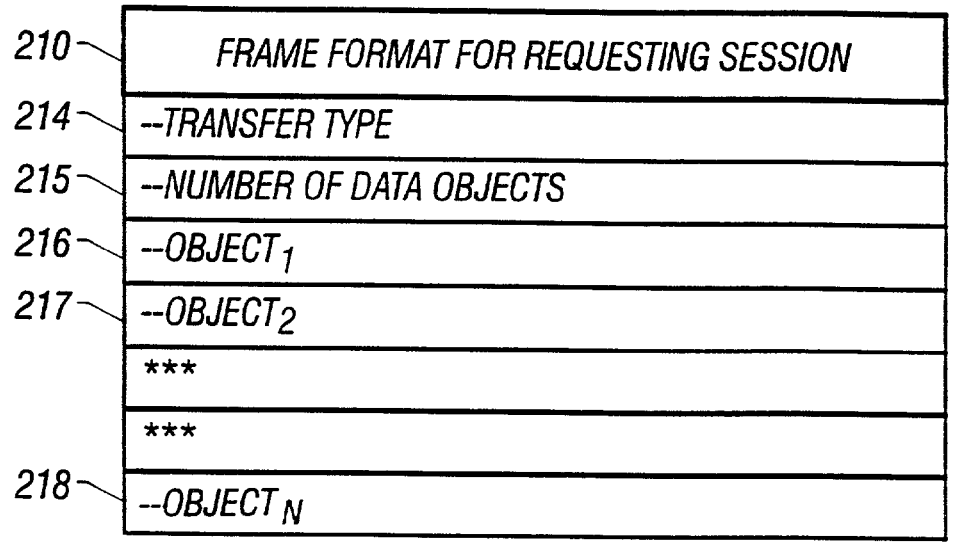
FIG. 6A shows a frame format, which a client device uses to request a data transfer session.

FIG. 6A shows one format for the frame 210 that a client device 104, 106 sends to request a data transfer session in FIG. 5A. The frame 210 has a plurality of segments 214-218 distinguished either by their position in the frame or by preselected start sequences. The first segment 214 indicates the type of transfer. The system 100 supports a preselected set of transfer types. In some embodiments, the transfer types are generic uploads and generic downloads. In other embodiments, the transfer types are more specialized uploads and downloads, e.g., for an image, an audio file, a library data base, etc. The second segment 215 indicates the number of data objects. The different data objects may include text data, image data, multimedia data, audio data, video data, etc. The client device 104, 106 decides which portions of a multi-file object will be different "data objects." A text file with four imbedded images could have one data object for each of the imbedded images. The handling process X, Y assigns to each data object a unique identifier and an associated storage volume 114, 116, 118. Different data objects may be subsequently transferred independently by the system 108. The next segments 216, 217, 218 of the frame 210 identify each data object. The frame 210 for requesting a data transfer session identifies the transfer type and the data objects to transfer.

Figure 6B:
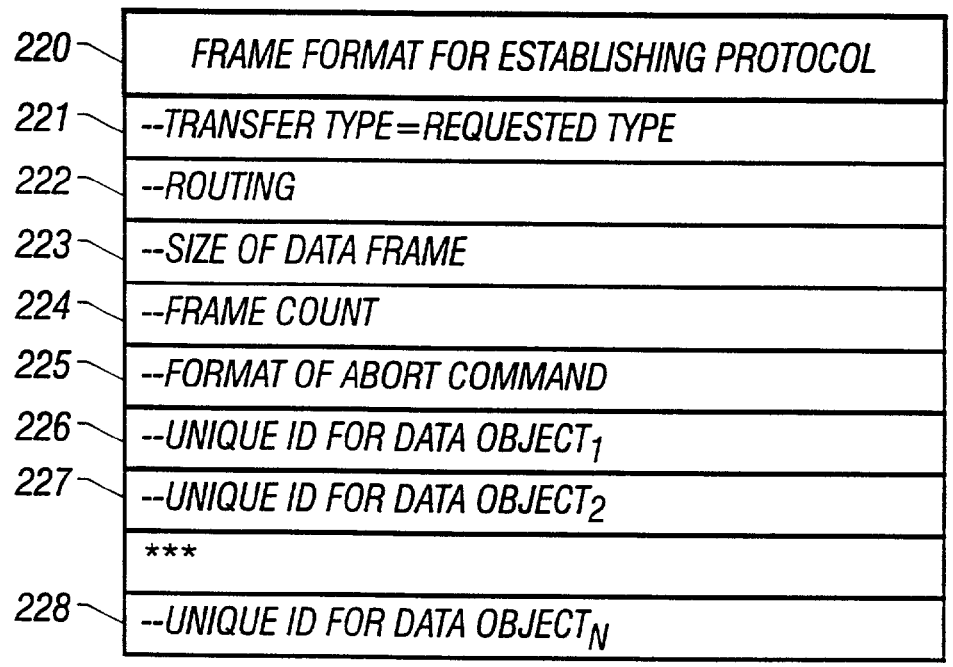
FIG. 6B shows a frame format, which the host device uses to establish a session protocol.

FIG. 6B shows one format for the frame 220 that the host device 102 sends to establish the session protocol in FIG. 5B. The frame 220 has a plurality of ordered segments 221-228. The first segment 221 identifies the transfer type of the session. The transfer type is an echo of the type requested by the client device 104, 106 in frame 210 of FIG. 6A. The second segment 222 identifies the routings for the processes X, Y assigned to handle the data objects of the session. From the routing, the client handler 120 can determine which handling process X, Y should get a frame subsequently received from the network 108. The third segment 223 defines the size of data frames for this session. The fourth segment 224 defines the frame count for the session. The fifth segment 225 defines the format of an abort command that either the sender or receiver can use to abort the entire data transfer session. The next segments 226-228 list the unique identifiers assigned to each data object of the session.

Depending on the implementation, the format of the frame 220 for establishing a protocol for a "download" session does not need to include segments for the size of data frames or for the frame count. Since the host computer 102 is transmitting the data frames in a "download", it is unnecessary to inform the client device 104, 106 the values of these parameters.

Figure 7:
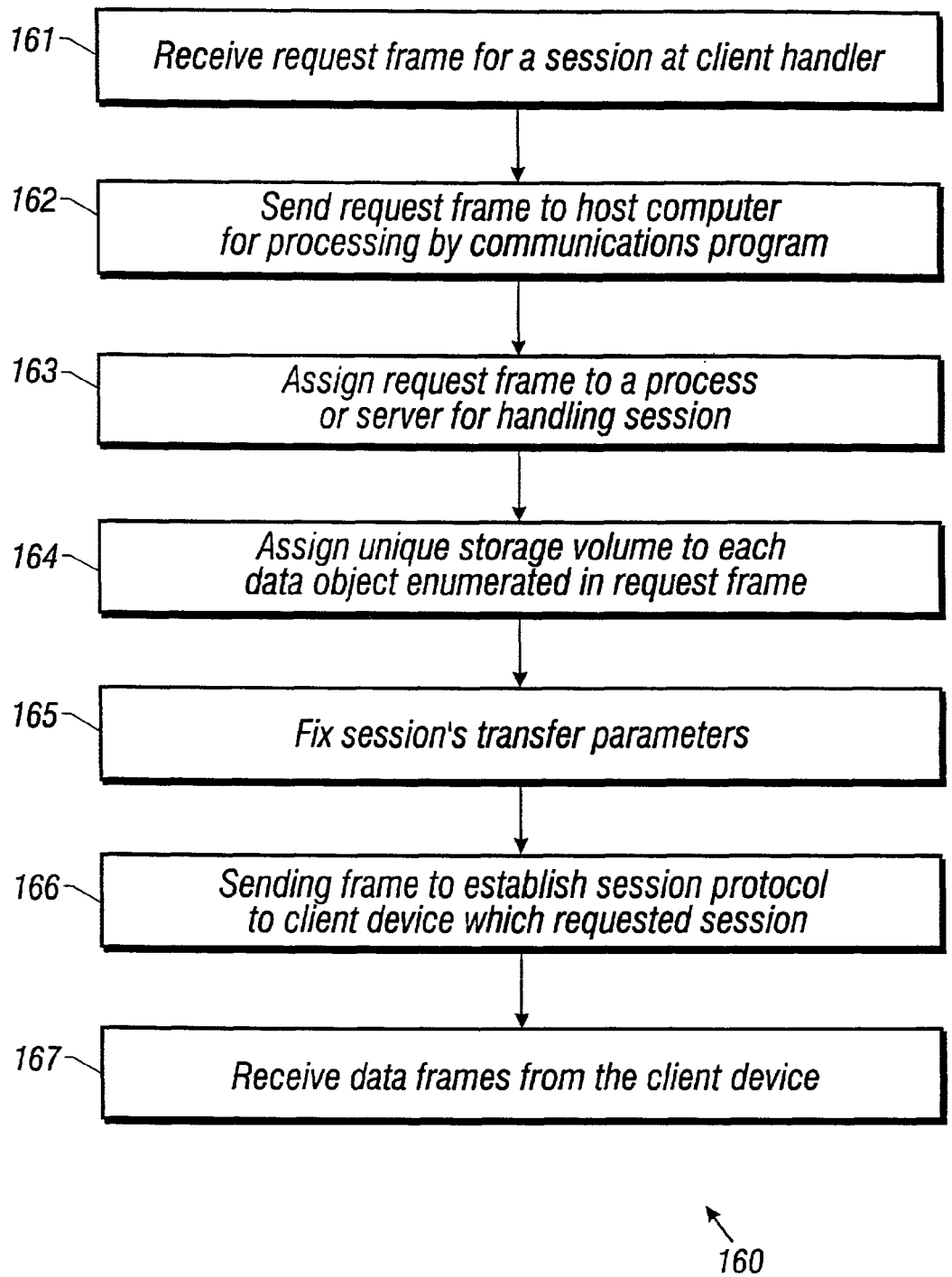
FIG. 7 is a flowchart illustrating a method for a host device to transfer data.

FIG. 7 is a flowchart for a method 160 by which the host device 102 transfers data according to the method 140 of FIG. 5B. A session begins when the client handler 120 receives the request frame 210 shown in FIG. 6A (step 161). The client handler 120 sends the request frame to the host computer 112 for handling by the network communications (NC) process, e.g., a program for routing electronic mail (step 162). The NC process assigns the request frame to one or more of processes X, Y of the host computer 112 (step 163) for handling.

The handling processes X, Y manage the remainder of the data transfer session. First, each handling process X, Y assigns a unique storage volume 114, 116, 118 to the data object that it has been assigned to handle by the NC process (step 164). To assign a storage volume, each handling process X, Y makes a list in which each entry includes one of the unique identifiers, an associated storage volume 114, 116, 118 and an associated data object. The identifier is unique among the set of identifiers for all data objects, all active sessions, and all inactive sessions for which accessible data remains in the storage volumes 114, 116, 118. Second, the handling processes X, Y fix the session transfer parameters such as the size of data frames and the frame count (step 165).

The host computer 112 assigns values to the transfer parameters based on the availability of host resources. The use of host resources is partially controllable through the values of the transfer parameters. For example, a frame count of one allows the client device 104, 106 to send only one more data frame in response to a request for more data from the host device 102. Thus, the host device 102 can stop the stream of data at any time. Similarly, a small size for data frames reduces the amount of space occupied in input buffers (not shown) of the client handler 120 during an upload. Finally, assigning larger values to the frame count and/or size for data frames enables the client devices 104, 106 with active data transfer sessions to use more of the host resources, i.e. to efficiently use available bandwidth of the host device 102.

The host device 102 sends a frame for establishing the session protocol to the client device 104, 106, which requested the session (step 166). The frame for establishing the protocol has the format 220 shown in FIG. 6B. Finally, the host device 102 receives a plurality of data frames from the client device 104, 106 (step 167).

Figure 8A:
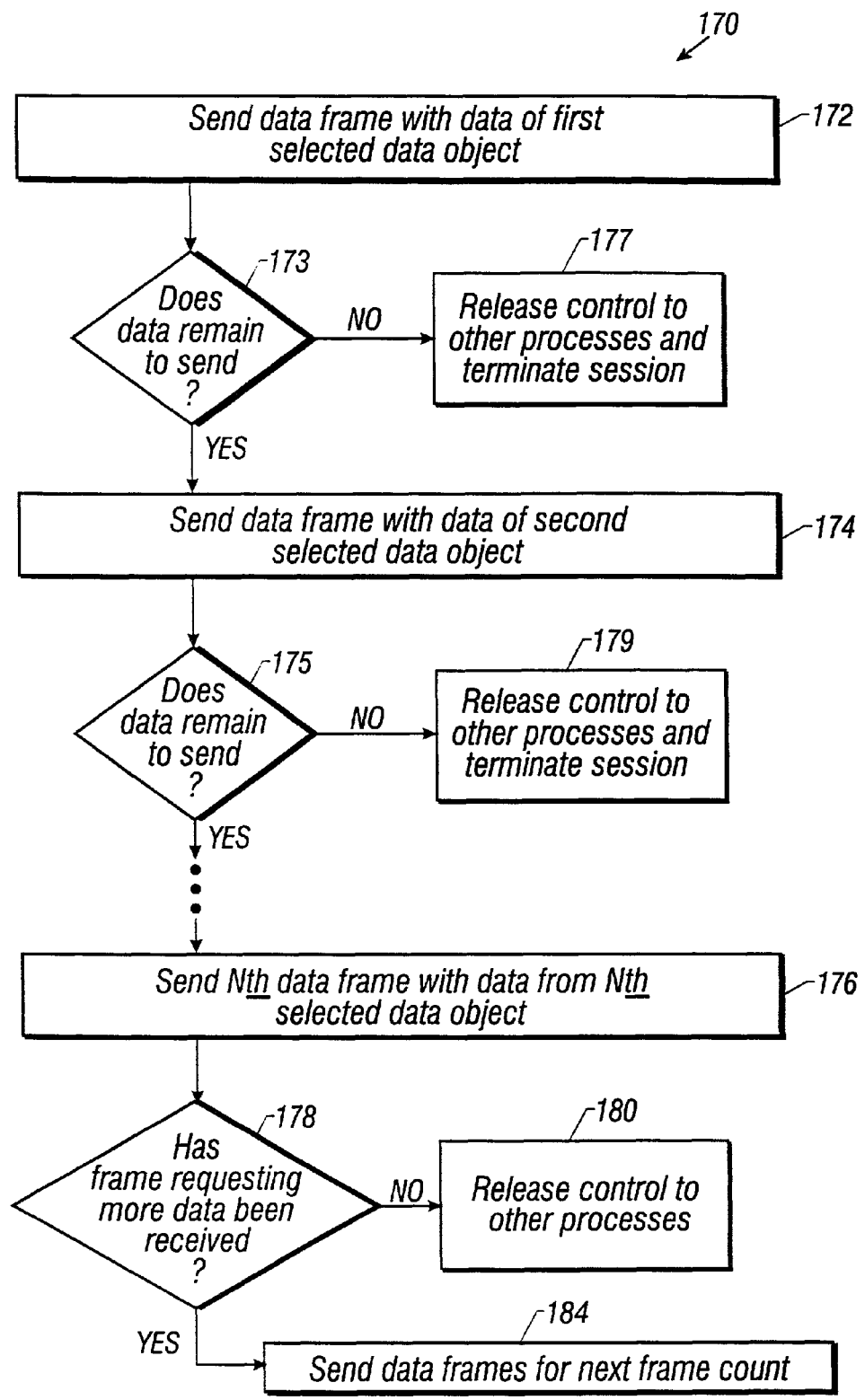
FIGS. 8A and 8B are flowcharts illustrating methods for transmitting and receiving data frames.
Figure 8B:
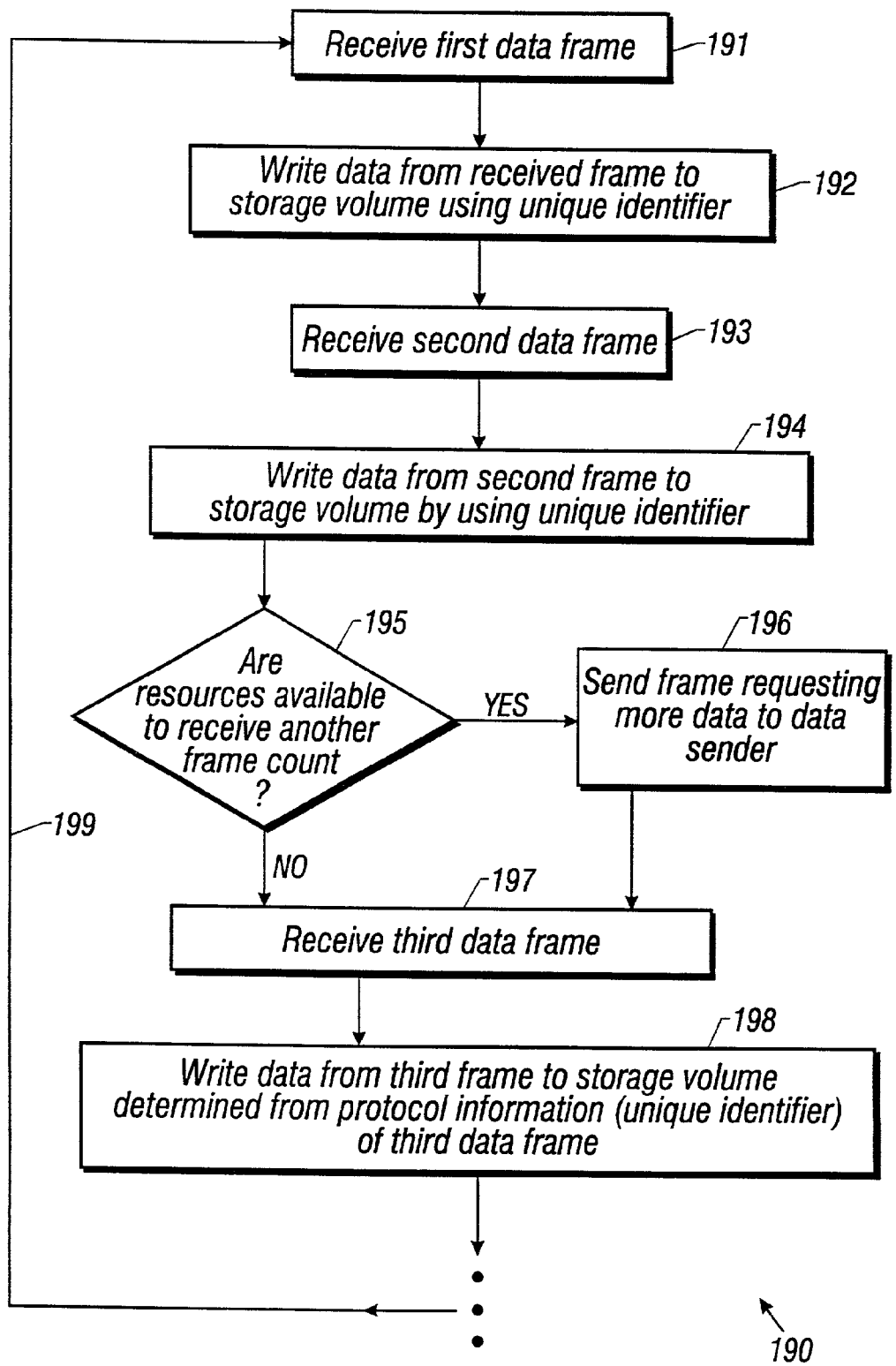

FIGS. 8A and 8B illustrate methods 170, 190 for transferring data frames according to steps 136, 148 of the methods 130, 140 of FIGS. 5A and 5B. FIG. 8A shows a method 170 used by a data sender, i.e. the host device 102 for a download and a client device 104, 106 for an upload. FIG. 8B illustrates the method 190 used by a data receiver, i.e. the host device 102 for an upload and a client devices 104, 106 for a download.

Referring first to FIG. 8A, a data sender transmits a sequence of up to N data frames for data portions of N selected data objects, N being the frame count (steps 172, 174, and 176). The various data frames 172, 174, 176 may contain data belonging to different data objects. After sending each data frame, the data sender determines whether data remains to send (steps 173 and 175). If data remains to send, the data sender proceeds to the next step of sending a data frame (steps 174 and 176). If data does not remain to send, the program controlling the sending of data frames releases control to other programs so that the sender can perform activities not related to sending data frames (steps 177 and 179). If no data remains to send, the data sender also terminates the session by sending to the data receiver a frame announcing that no more data remains (steps 177 and 179).

After sending a frame count of N data frames, the data sender determines whether a frame requesting more data has been received from the data receiver (step 178). If the data sender has not received the frame requesting more data, the data sender releases control to other processes of the sender (step 180). If the data sender has received a frame requesting more data frames, the data sender sends the data frames for the next frame count (step 184). If the data sender receives the request for more data at a later time, it will start sending the next frame count of data frames (not shown) at that time. The frame count or number of successive data frames 172, 174, 176 that the sender sends without waiting is determined by the session protocol.

FIG. 8B shows a method 190 by which a data receiver receives data frames that were sent according to the method 170 of FIG. 8A. The data receiver receives the first data frame sent in step 172 of FIG. 8A (step 191). Each data frame has protocol information and a data packet. The protocol information includes a routing, which identifies the handling process X, Y, and a unique identifier for a data object. The handling process X, Y uses the unique identifier to determine which storage volume 114, 116, 118 is assigned to the data object. The handling process X, Y writes or appends the data packet from the data frame to the storage volume 114, 116, 118 determined from the unique identifier (step 192). Next, the data receiver receives the second data frame associated with the second selected data object from step 174 of FIG. 8A (step 193). The data receiver uses the unique identifier from the second data frame to write or append the second data packet therein to the storage volume 114, 116, 118 assigned to the second selected data object (step 194). The data receiver repeats steps 193 and 194 for successively received data frames (not shown).

The data receiver writes or appends data frames for data from a data object to a storage volume 114, 116, 118 in a sequential fashion. The receiver writes or appends earlier sent data frames to the assigned storage 114, 116, 118, for a data object, before appending later sent data frames for the same data object. Writes of data packets for the same data object are in the order sent. Of course, the data receiver need not write data frames for different data objects to the storage volumes 114, 116, 118 in the order sent.

After receiving a preselected number of data frames, the data receiver determines whether resources are available to receive another frame count of data frames (step 195). If resources are available, the receiver sends a frame requesting more data to the data sender (step 196). Then, the receiver continues receiving and writing data packets from received data frames to the storage volumes 114, 116,118 using the unique identifiers provided by the data frames themselves (steps 197 and 198). If the data receiver sends a frame requesting more data at step 197, the data receiver will receive the next frame count of data frames from the data sender and will repeat steps 192-197 (loop 199). Thus, the data receiver receives the next frame count only if it sends a frame requesting more data. In other words, data is transferred between the sender and receiver using handshaking.

Figure 8C:
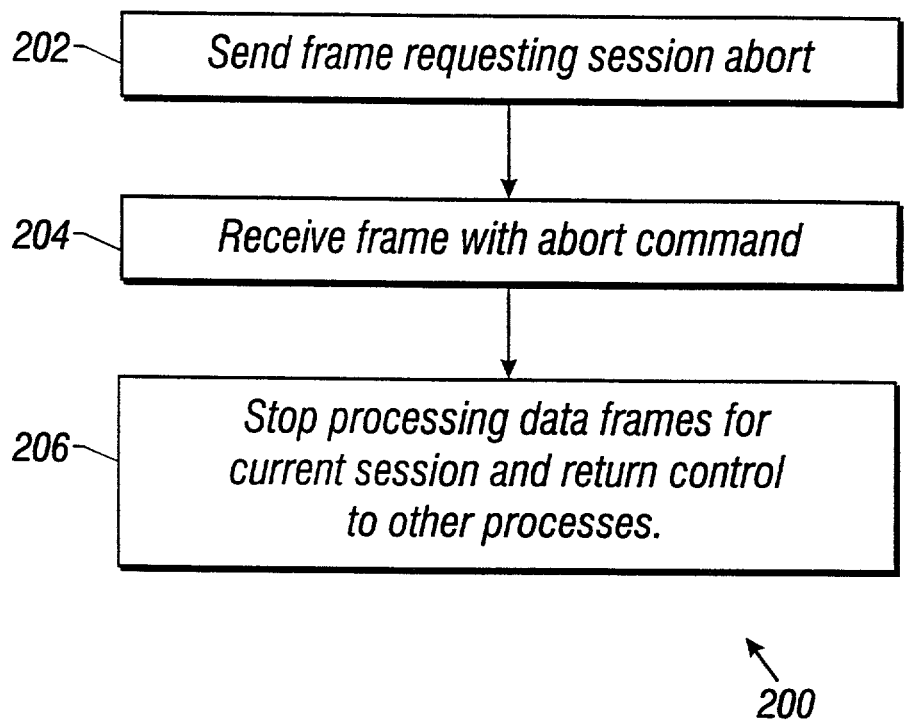
FIG. 8C is a flowchart illustrating a command to terminate an entire data transfer session.

FIG. 8C illustrates a method 200 of aborting a data transfer session, which has been established at step 134, 146 of FIGS. 5A and 5B. A first device for the data transfer session, i.e. either the data receiver or sender, sends to the second device for the session, i.e. the data sender or receiver, respectively, a frame with an abort command (step 202). The second device receives the frame with the abort command (step 204). In response to receiving the abort request, the second device stops processing data frames for the data transfer session indicated in the frame with the abort command (step 206). The device receiving the frame to abort returns control to other programs and processes therein.

Both the host device 102 and the client device 104, 106 can terminate an entire data transfer session with an abort command. The abort or termination of an entire session is a second type of "handshaking" between host and client devices 102, 104, 106.

Figure 9A:
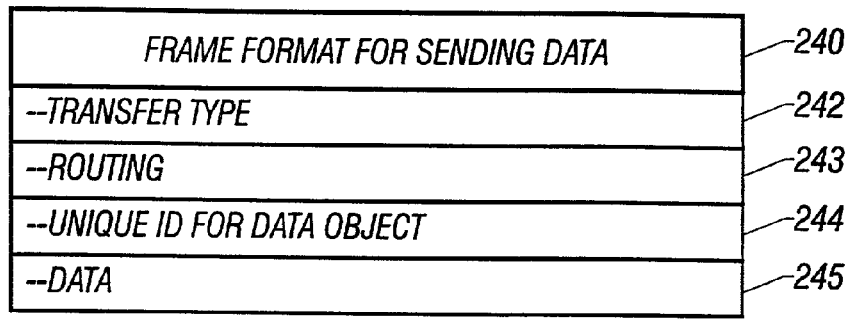
FIG. 9A shows a format of a data frame used to transfer portions of data objects.

FIG. 9A shows one format 240 for data frames according to the methods 130, 140, 170, 190 of FIGS. 5A-5B and 8A-8B. Each data frame 240 has a plurality of segments 242-244 for types of information mandated by the session protocol. A first segment 242 identifies the transmission type, i.e. upload and download or another type discussed above. A second segment 243 identifies the routing of the process X, Y handling this data object. A third segment 244 gives the unique identifier associated with the data object being transferred. From the unique identifier, the host device 102 can determine where to store data portion being uploaded, and the client device 104, 106 can determine what to do with data portion being downloaded. The remaining segment 245 contain the data portion or packet being transferred. Each data frame 240 includes a data portion and identifies the transfer type, routing of the process X, Y handling the data object, and the storage identifier for the data object being transferred.

Figure 9B:
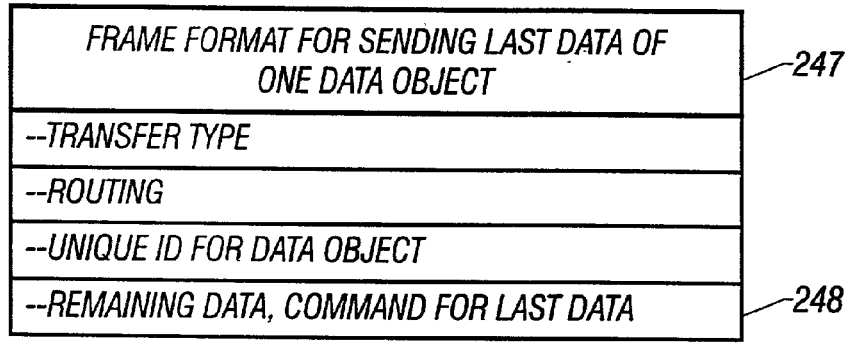
FIG. 9B shows a format of a data frame used to indicate the last data of a data object.

FIG. 9B shows the format of a data frame 247 for signaling the last data for a data object of the data transfer session. The first three segments of the frame 247 have the same format as in other data frames 240 shown in FIG. 9A. The last segment 248 of the frame 247 includes both the remaining data portion of the data object being transferred and a command sequence. The command sequence indicates that the data of this frame is the last data of the session for the identified data object. The handling process X, Y of the host computer 112 and the data transfer program "DT" of the client device 104 terminate the session with respect to this data object in response to receiving the command for the last data. Any of the data frames in steps 172, 174, 176 and 191-194, 197-198 in FIGS. 8A and 8B can be a frame for last data—signaling the completion of the transfer of one data object.

Figure 9C:
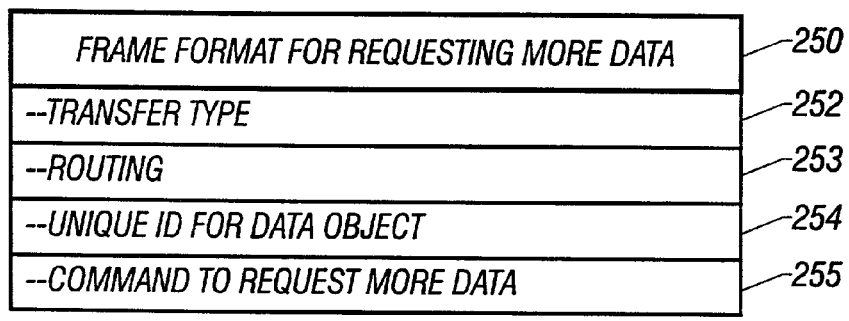
FIG. 9C shows the format of the frame used to request more data in the methods shown in FIGS. 8A and 8B.

FIG. 9C shows the format for a frame 250 for requesting more data, i.e. the handshake from the data receiver. The frame for requesting more data 250 has segments 252, 253, 254, for a transfer type, a routing of a handling process X, Y, and a unique identifier analogous to the segments 242, 243, 244 of the data frame 240 shown in FIG. 9A. The last segment 255 of the frame 250 is a command sequence to request the next frame count of data frames.

Figure 9D:
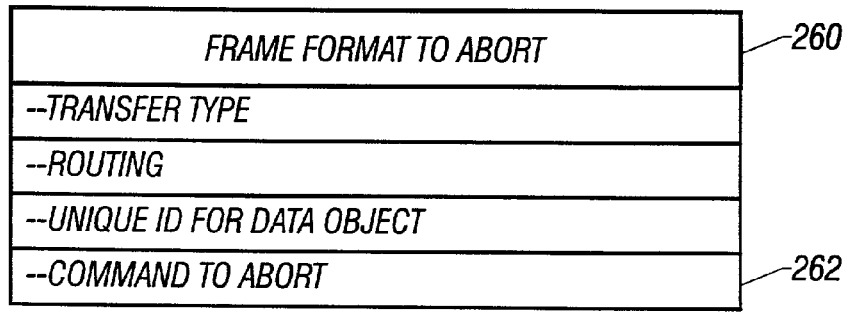
FIG. 9D shows a format of a frame that either the client or host device can send to abort the session in FIG. 8C.

FIG. 9D shows the format of an abort frame 260 used by the method 200 of FIG. 8C. The first three segments of the abort format are analogous to those of the frame 250 for requesting more data, which is shown in FIG. 9C. The last segment 262 of the abort frame 260 contains a command sequence to abort the entire data transfer session. Either the host or client devices 102, 104, 106 can transmit an abort frame at any step of FIGS. 8A and 8B.

Figure 10:
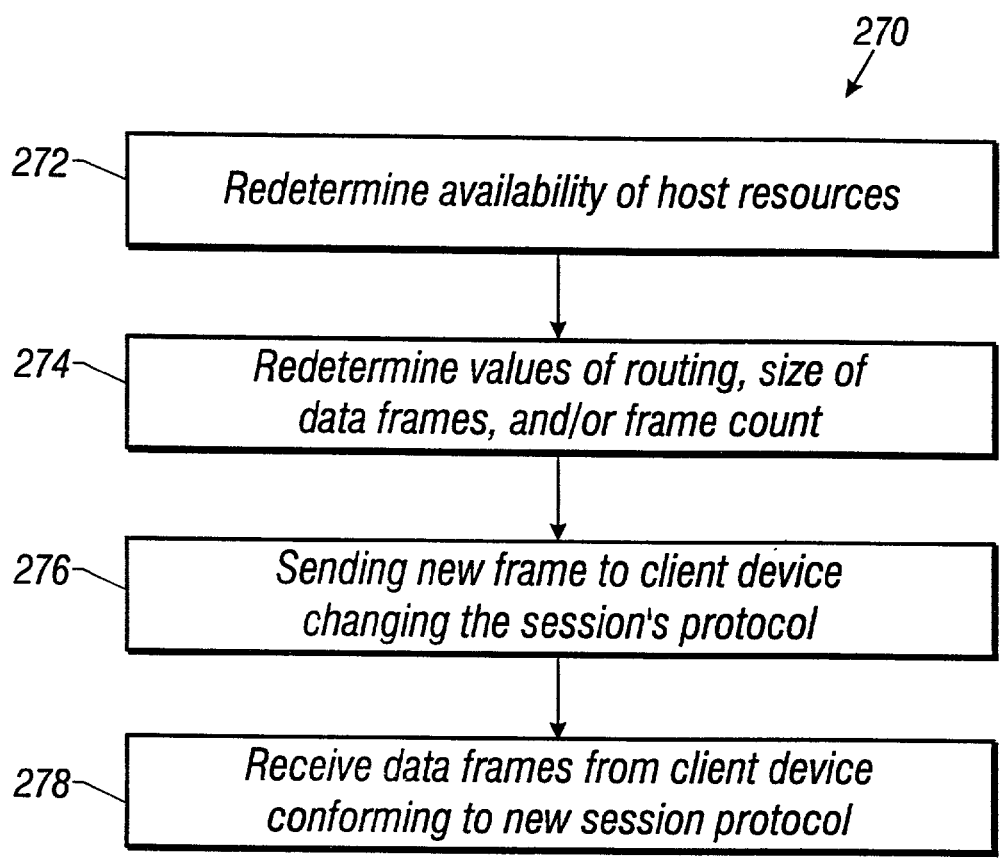
FIG. 10 illustrates a method by which the host device may change the size of data frames and/or the frame count dynamically.

FIG. 10 illustrates a method 270 by which the host device 102 may change the routing, the size of data frames, and/or the frame count dynamically. To implement such a change, the host device 102 redetermines the available host resources (272). The host device 102 determines the values of the new routing, size of data frames and/or frame count (step 274). Then, the host device 102 sends a frame to the client device 104, 106 to establish a new protocol for the session (step 276). The new frame indicates the original transfer type, routing, and unique identifiers and also indicates the new routing, size of data frames, and/or frame count. The client device 104, 106 uses the new routing, size for data frames and frame count in response to receiving the frame for the new protocol from the host device 102 (step 278). The host device 102 may dynamically change the routing, the size of data frames and/or the frame count to more efficiently use available host resources or to reduce the risk of overloading the host's input buffers.

In some embodiments the routing 222, 243, 253 may be the actual address, in the memory 124, for the handling process X, Y assigned to a particular data object.

In some embodiments, the format of the data frames 240 and last data of a type frames 247 for a "download" session do not include segments for the size of data frames or for the routings of handling processes X, Y.

The client devices 104, 106 of FIG. 4 can interleave sending frames for different data objects, because each frame includes a unique identifier and a routing. The client handler 120 keeps a list of routings for the handling processes X, Y 114, 116, 118 assigned to each data transfer session. The client handler 120 uses the list to route data and control frames for different data objects and sessions to the proper processes X, Y. The handling processes X, Y use the unique identifier to determine the storage volume 114, 116, 118 assigned for storage of data from each frame. Since the handling of data frames does not depend on the order received, the client device 104, 106 can upload data frames in any convenient manner, e.g., by interleaving data frames for different data objects or for different sessions.

Similarly, the host device 102 of FIG. 4 can interleave sending data frames for the various data objects of a download session. The client device 104, 106 uniquely identifies received data frames by the same unique identifier, which enabled the host device 102 to identify data portions of the different data objects. Once the client device 104, 106 knows the data object, it knows what to do with the data. The order of delivery is not needed to identify the data object or data transfer session for a downloaded data frame.

In one embodiment, the host device 102 interleaves the transfer of the data objects for the different image objects imbedded in text. In this embodiment, the client device 104, 106 receives coarse grained forms of each image embedded in the text object substantially simultaneously. As the transfer continues each of the images becomes clearer at a uniform rate. This embodiment enables a client to view all of the embedded images, at least coarse versions of all images, before the entire download completes.

Similarly, both the client devices 104, 106 and the host device 102 can interleave sending data frames for different data transfer sessions. Each data frame has a unique identifier for the data object to which the data portion therein belongs and a routing for a handling process X, Y. The routing enables the client handler 120 to recognize the session's handling processes X, Y. The unique identifier enables the handling processes X, Y to determine the session's storage volumes 114, 116, 118. The unique identifiers also enable the client devices 104, 106 to recognize the session to which a received data frame belongs. Arrival order of data frames is inessential to recognizing the data transfer session to which the data frames belong.

The techniques and methods may be implemented in computer hardware or software, or a combination of the two. However, the techniques are not limited to any particular hardware or software configuration. Instead, they may find applicability in any computing or processing environment for transferring data between client and host devices. Preferably, the techniques are implemented in computer programs executing on programmable computers that each include a processor, storage medium readable by the processor (including volatile and non-volatile memory and/or storage elements), at least one input device, and one or more output devices. Program code operates on data entered using the input device to perform the functions described and to generate output information. The output information is applied to the one or more output devices.

Each program is preferably implemented in a high level procedural or object oriented programming language to communicate with a computer system. However, the programs can be implemented in assembly or machine language, if desired. In any case, the language may be a complied or interpreted language.

Preferably a storage medium or device (e.g., CD-ROM, hard disk or magnetic diskette) stores each such program. The storage medium or device is readable by a general or special purpose programmable computer to configure and operate the computer to perform the methods described in this document when read by the computer. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of asynchronously transferring a plurality of data objects, the method comprising:
    transmitting, from a client to a host, a request data frame for a data transfer session, the frame including a transfer type and a plurality of segments that each identify one of the data objects to be transferred between the client and the host;
    receiving, from the host, a plurality of identifiers assigned by the host, each identifier corresponding to one of the data objects to be transferred; and
    receiving, at either the client or the host, a transfer data frame including at least one assigned identifier and at least a portion of a corresponding data object, wherein the identifier is
        (a) used by the host to store the portion of the data object in a storage device when the transfer data frame is received at the host, or
        (b) used by the client to identify a transfer session corresponding to the portion of the data object when the transfer data frame is received at the client.

2. The method of claim 1, wherein the transfer type is a download.

3. The method of claim 1, wherein the transfer type is an upload.

4. The method of claim 1, further comprising repeating the data frame transfers until the plurality of data objects have been transferred.

5. The method of claim 4, further comprising interleaving the receiving of the transfer data frame corresponding to one data object with other transfer data frames corresponding to another data object.

6. The method of claim 4, further comprising receiving, from the host, a frame count that indicates the number of data frames that the client device can transfer without request for more data.

7. The method of claim 4, further comprising receiving, from the host, routing information to handle each of the plurality of data objects.

8. The method of claim 4, wherein the repeating of the data frame transfers include transferring at least one end data frame comprising a command sequence indicating the last portion of data of the transfer session for at least one data object.

9. The method of claim 4, wherein at least two sequential transfers of a data frame include transfers of frames with different identifiers.

10. The method of claim 1, wherein the identifier is further used by the client to identify the type of the data object in the transfer data frame when the transfer data frame is received at the client.

11. A computer-implemented method of transferring a plurality of data objects with a client device, the method comprising:
    transmitting, to a host, a request data frame for a data transfer session, the frame including a transfer type and a plurality of segments that each identify one of the data objects to be transferred between the client device and the host;
    receiving a plurality of identifiers assigned by the host, each identifier corresponding to one of the data objects to be transferred;
    when the transfer type is an upload, transmitting to the host an upload data frame including at least one assigned identifier and at least a portion of a corresponding data object, the identifier used by the host to store the portion of the data object in a storage device; and
    when the transfer type is a download, receiving a download data frame including at least one assigned identifier and at least a portion of a corresponding data object, the identifier used by the client to identify the type of data object in the download data frame.

12. The method of claim 11, further comprising transferring the upload data frames or the download data frames until the plurality of data objects have been transferred.

13. The method of claim 12, further comprising interleaving the transferring of the upload data frames or the download data frames corresponding to one data object with other transfer data frames corresponding to another data object.

14. The method of claim 12, wherein the identifier is used by the client to identify a transfer session corresponding to the portion of the data object when the download data frame is received at the client.

15. The method of claim 14, further comprising interleaving the transferring the upload data frames or the download data frames with transferring upload data frames or download data frames corresponding to a different transfer session, respectively.

16. The method of claim 14, further comprising interleaving the transferring the upload data frames or the download data frames with transferring download data frames or upload data frames corresponding to a different transfer session, respectively.

17. The method of claim 12, further comprising receiving, from the host, a frame count that indicates the number of data frames that the client device can transfer without request for more data.

18. A computer-implemented method of transferring a plurality of data objects at a host, the method comprising:
    receiving, from a client device, a request data frame for a data transfer session, the frame including a transfer type and a plurality of segments that each identify one of the data objects to be transferred;
    assigning a plurality of identifiers, each identifier corresponding to one of the data objects to be transferred between the client device and the host;
    transferring, to the client device, the plurality of identifiers;
    when the transfer type is an upload, receiving at the host an upload data frame including at least one assigned identifier and at least a portion of a corresponding data object, the identifier used to store the portion of the data object in a storage device at the host;
    when the transfer type is a download, transmitting a download data frame including at least one assigned identifier and at least a portion of a corresponding data object, the identifier used by the client to identify the type of the data object in the download data frame; and
    repeating the data frame transfers until the plurality of data objects have been transferred.

19. The method of claim 18, further comprising allocating host resources for the data transfer session.

20. The method of claim 18, further comprising transmitting routing information for handling each of the plurality of data objects.

21. The method of claim 18, wherein at least two sequential transfers of a data frame include transfers of frames with different identifiers.

22. The method of claim 18, wherein the identifier is used by the client to identify a transfer session corresponding to the portion of the data object when the download data frame is received at the client.

23. The method of claim 22, further comprising interleaving the transferring of the upload data frames or the download data frames with transferring upload data frames or download data frames corresponding to a different transfer session, respectively.

24. The method of claim 22, further comprising interleaving the transferring the upload data frames or the download data frames with transferring download data frames or upload data frames corresponding to a different transfer session, respectively.

25. A non-transitory computer readable medium encoding a set of instructions to asynchronously transfer a plurality of data objects, the instructions being executable by at least one processor to cause the processor to perform the following steps:

transmitting, from a client to a host, a request data frame for a data transfer session, the frame including a transfer type and a plurality of segments that each identify one of the data objects to be transferred between the client and the host;

receiving, from the host, a plurality of identifiers assigned by the host, each identifier corresponding to one of the data objects to be transferred; and receiving, at either the client or the host, a transfer data frame including at least one assigned identifier and at least a portion of a corresponding data object, wherein the identifier is (a) used by the host to store the portion of the data object in a storage device when the transfer data frame is received at the host, or (b) used by the client to identify the type of the data object in the transfer data frame when the transfer data frame is received at the client.

* * * * *